(12) United States Patent
Vong et al.

(10) Patent No.: US 6,480,372 B1
(45) Date of Patent: Nov. 12, 2002

(54) COMPUTER WITH A HIDDEN KEYBOARD

(75) Inventors: William H. Vong, Seattle, WA (US);
Steven T. Kaneko, Medina, WA (US);
Kenneth R. Robertson, Redmond, WA (US); Kenneth V. Fry, Seattle, WA (US); Manolito E. Adan, Woodinville, WA (US); Steven W. Fisher, Edmonds, WA (US); Gregory G. Jones, Seattle, WA (US); Carl J. Ledbetter, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,981

(22) Filed: Apr. 24, 2000

(51) Int. Cl.[7] .............................. H05K 5/02; H05K 7/14
(52) U.S. Cl. ...................... 361/680; 361/686; 361/683; 361/727
(58) Field of Search ................................ 361/679–686, 361/725, 727, 728–730; 348/794

(56) References Cited

U.S. PATENT DOCUMENTS

| | | | | |
|---|---|---|---|---|
| 4,086,655 A | * | 4/1978 | Tanimoto et al. | 364/705 |
| 5,062,609 A | * | 11/1991 | Hames et al. | 248/676 |
| 5,175,672 A | * | 12/1992 | Conner et al. | 361/393 |
| 5,187,641 A | * | 2/1993 | Muskatello et al. | 361/380 |
| 5,241,303 A | * | 8/1993 | Register et al. | 340/706 |
| 5,313,596 A | * | 5/1994 | Swindler et al. | 395/325 |
| 5,539,615 A | * | 7/1996 | Sellers | 361/680 |
| 5,619,398 A | * | 4/1997 | Harrison et al. | 361/686 |
| 5,625,533 A | * | 4/1997 | Kim et al. | 361/681 |
| 5,648,762 A | * | 7/1997 | Ichimura et al. | 340/825.31 |
| 5,664,118 A | * | 9/1997 | Nishigaki et al. | 395/283 |
| 5,666,497 A | * | 9/1997 | Milhaupt et al. | 395/309 |
| 5,673,169 A | * | 9/1997 | Wicks | 361/680 |
| 5,708,458 A | * | 1/1998 | Vrbanac | 345/156 |
| 5,861,822 A | * | 1/1999 | Park et al. | 341/22 |
| 5,907,718 A | * | 5/1999 | Shiga | 395/887 |
| 5,925,110 A | * | 7/1999 | Klein | 710/15 |
| 6,038,127 A | * | 3/2000 | Ries | 361/680 |

* cited by examiner

Primary Examiner—Anatoly Vortman
(74) Attorney, Agent, or Firm—Banner & Witcoff, Ltd.

(57) ABSTRACT

A computer system has a keyboard storage portion and carrier. The computer system may be a personal computer capable of generating a control signal. A keyboard holding carrier slides in and out of a processing housing. This enables selective positioning of a keyboard within the processing housing. A drive mechanism imparts reciprocal movement to the carrier and a drive control system is responsive to the control signal from the personal computer. Also included is a sensor connected to the drive mechanism that determines a position of the carrier relative to the personal computer.

45 Claims, 13 Drawing Sheets

COMPUTER WITH A HIDDEN KEYBOARD

FIELD OF THE INVENTION

The present invention generally relates to computers, in particular, to computer systems with a storage housing for its keyboard.

BACKGROUND OF THE INVENTION

The computer has become an indispensable electronic machine for the industrialized world. In particular, computers are used by businesses and households for numerous automated tasks and other complex functions. The advent of the Internet and the World Wide Web are creating new opportunities for consumers and businesses to exploit information technology, such as electronic commerce, on-line bill paying, web surfing, web-based information services, and other services.

As computers are becoming one of the most important electronic appliances in society, they will be placed in various physical locations in offices or homes. In homes and offices there is usually a limited amount of desktop or countertop space. Home users may want to locate the computer on a kitchen countertop surface for use in finding recipes on the Internet or using the computer as a viewing device for television. These uses require space in terms of volume and surface area to setup the computer.

In general, computers systems, such as personal computers, are frequently supplied in desktop models with a separate keyboard. For example, a home user purchasing a computer receives a separate computer housing unit, a video display unit or monitor (which may or may not be integrated with the housing unit), a keyboard, a mouse, and a number of peripherals. The consumer must then find a flat surface on which to set or place the personal computer or the consumer purchases a desk dedicated for the computer. Extra desktop surface area is needed to place the keyboard and the keyboard increases the clutter in the area. In the example of the kitchen, preserving surface area is important so the home user can perform other tasks in the kitchen.

Exposed keyboards have problems for many users. The keyboard may be dislodged from the resting surface and be damaged. There are problems of liquids or drinks being spilled into the keyboard. With computer systems being place in more nontraditional locations, there is an increased potential for damage to keyboards. Also, conventional personal computers having exposed keyboard are susceptible to key failures. Since the exposed keyboard is unprotected, overtime air-borne dust particles may become lodged between the physical keys of the keyboard. This dust may cause contact problems in the keys and micro-switches that operate with the keys. While a keyboard may be attached to a sliding tray positioned below a desktop such that the user manually pulls out the keyboard for use, such mounting is feasible only in limited applications. Thus what is needed a device that preserves worktop surface space and reduces the potential for damage to a keyboard of a computer.

SUMMARY OF THE INVENTION

The present invention is directed to a computer system having a keyboard, a keyboard storage portion and a carrier that overcomes the disadvantages in the prior art.

In one aspect of the present invention a computer system includes a processing unit, and a carrier that is movable relative to the processing unit. The carrier is sized for retaining a keyboard. A drive mechanism capable of moving the carrier in different directions.

In another aspect of the present invention the computer system includes a processing unit housing, in which the housing includes a keyboard storage portion. The keyboard storage portion is at least partially located within the housing. Also included is a movable carrier sized for retaining a keyboard thereon. The carrier has a first position at least partially disposed within the keyboard storage portion and a second position at least partially disposed outside of the keyboard storage portion.

In yet another aspect of the present invention the computer system includes a keyboard having a battery connected to a charging connector. Also included is a carrier sized for retaining the keyboard. The carrier has at least a portion of a battery charger for charging the battery of the keyboard.

In another aspect of the present invention, the computer system includes a processing unit, and a keyboard having a transmitter for transmitting a signal. Further included is a carrier that is sized to retain the keyboard. The carrier has a receiver for receiving the keyboard signal. The carrier is operatively coupled to the processing unit for processing the signal.

Another aspect of the present invention, includes a method of moving a keyboard for the computer system having a movable carrier sized to retain the keyboard, and a drive mechanism coupled to the carrier. The method includes providing a control signal to the drive mechanism, and moving the carrier by the drive mechanism. Another aspect of the present invention includes a method of charging a keyboard for a computer system including a carrier having a portion of a battery charger. The method includes connecting the keyboard to a portion of the battery charger. And disconnecting the keyboard from the portion of the battery charger.

Yet another aspect of the present invention includes a method of wireless communication in a computer system. A keyboard has a wireless transmitter. A movable carrier retains the keyboard. The method includes transmitting a signal from the transmitter. The signal is received by the carrier having a receiver mounted on it. The signal is processed by the computer system.

These and other aspects of the present invention will be apparent upon consideration of the following detailed description thereof, presented in connection with the following drawings in which like reference numerals identifying the elements throughout.

DETAILED DESCRIPTION OF THE PREFERRED EMBODIMENTS

Figure 1:
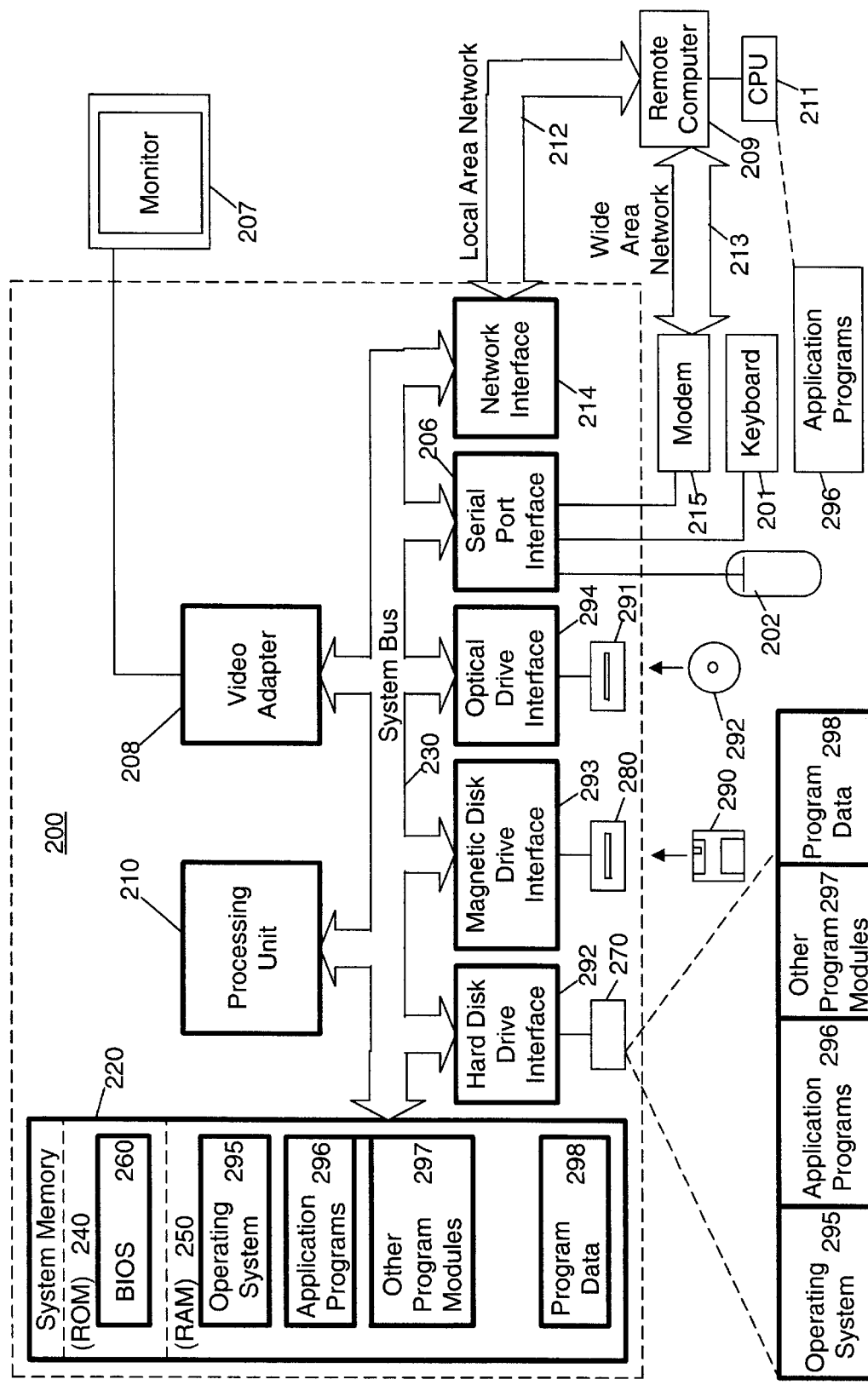
FIG. 1 is a schematic diagram of one example of a computer system according to the present invention.

FIGS. 1–16 illustrates a computer system according to the present invention designated generally by reference numeral 100. The computer system 100 may be a personal computer 200, such as shown in FIG. 1, and may further include a keyboard 201, and a carrier 160 connected to a drive mechanism 180 and a drive control system 177.

FIG. 1 is a schematic diagram of one example of a computing environment in which the computer system 100 of present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory ("ROM") 240 and random access memory (RAM) 250.

A basic input/output system 260 ("BIOS"), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, zip drives, random access memories ("RAMs"), read only memories ("ROMs"), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. The pointing device 202 may be a device, or a mouse. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus ("USB"). A monitor 207 or other type of display device, such as a liquid crystal display ("LCD") is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 5. The logical connections depicted in FIG. 5 include a local area network ("LAN") 212 and a wide area network ("WAN") 213. Such networking environments are commonplace in offices, enterprise-wide computer networks, intranets, the Internet and the World Wide Web.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet or the world wide web. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

Figure 5:
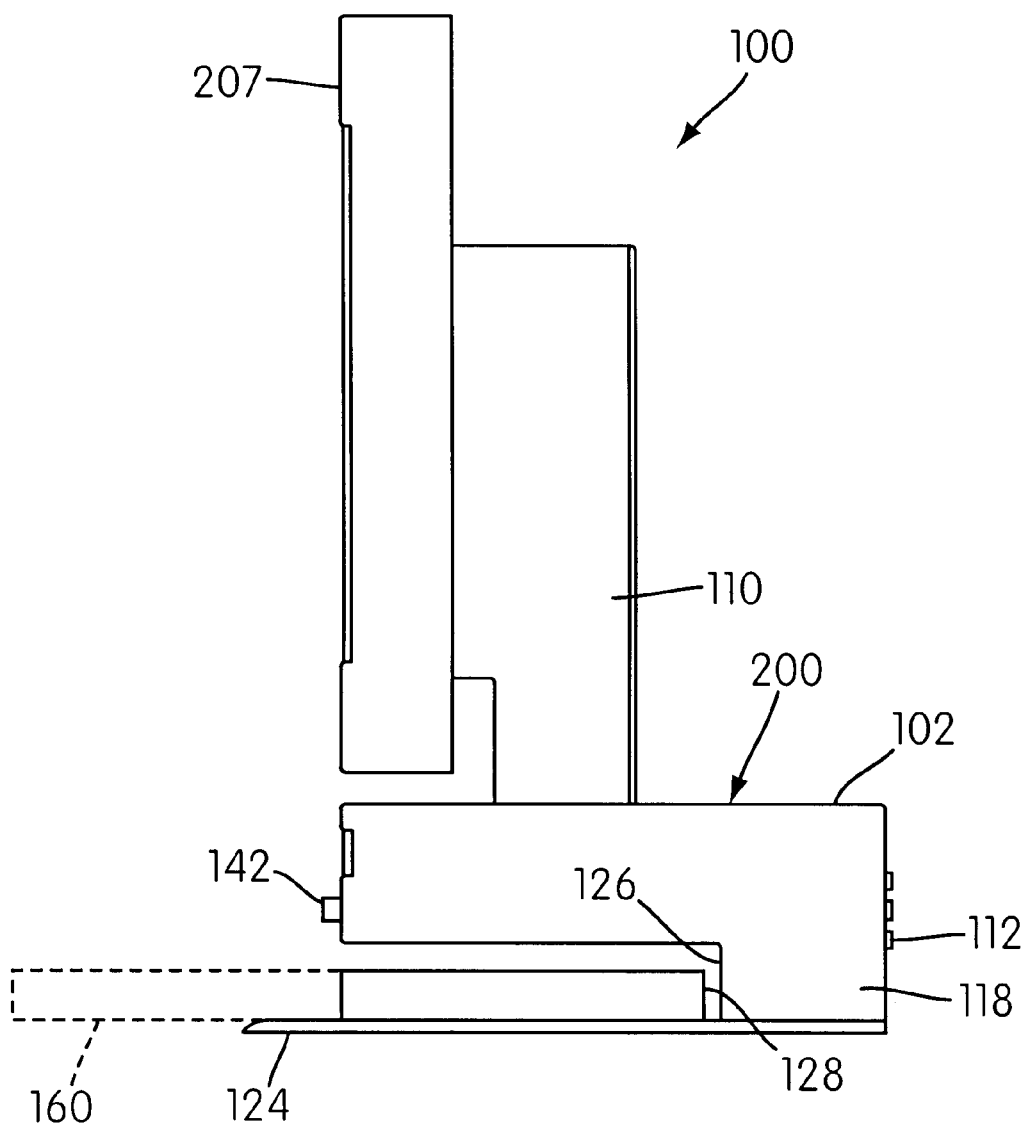
FIG. 5 is a right side elevational view of the computer system.

For a brief overview of the operation of the present invention, FIG. 5 illustrates the computer system 100 in the preferred embodiment shown with the carrier 160 in a first position (as shown in the solid lines) and a second position (as shown in the broken lines). The carrier 160 retains or supports the keyboard 201 for movement thereof. As shown in the solid lines, the first position is defined when the carrier 160 is substantially located, or at least a portion of it is located in a keyboard storage portion 104. As shown in the dotted or broken lines, the second position is defined when the carrier 160 is in position to allow the keyboard 201 to be accessible or exposed to the user. Note the second position may be an extended location in which the keyboard 201 is substantially outside of the keyboard storage portion 104. The drive mechanism 180 moves the carrier 160 between the first position and the second position. In general, the carrier 160 may operate similar to a compact disk ("CD") tray system found in the art.

Figure 2:
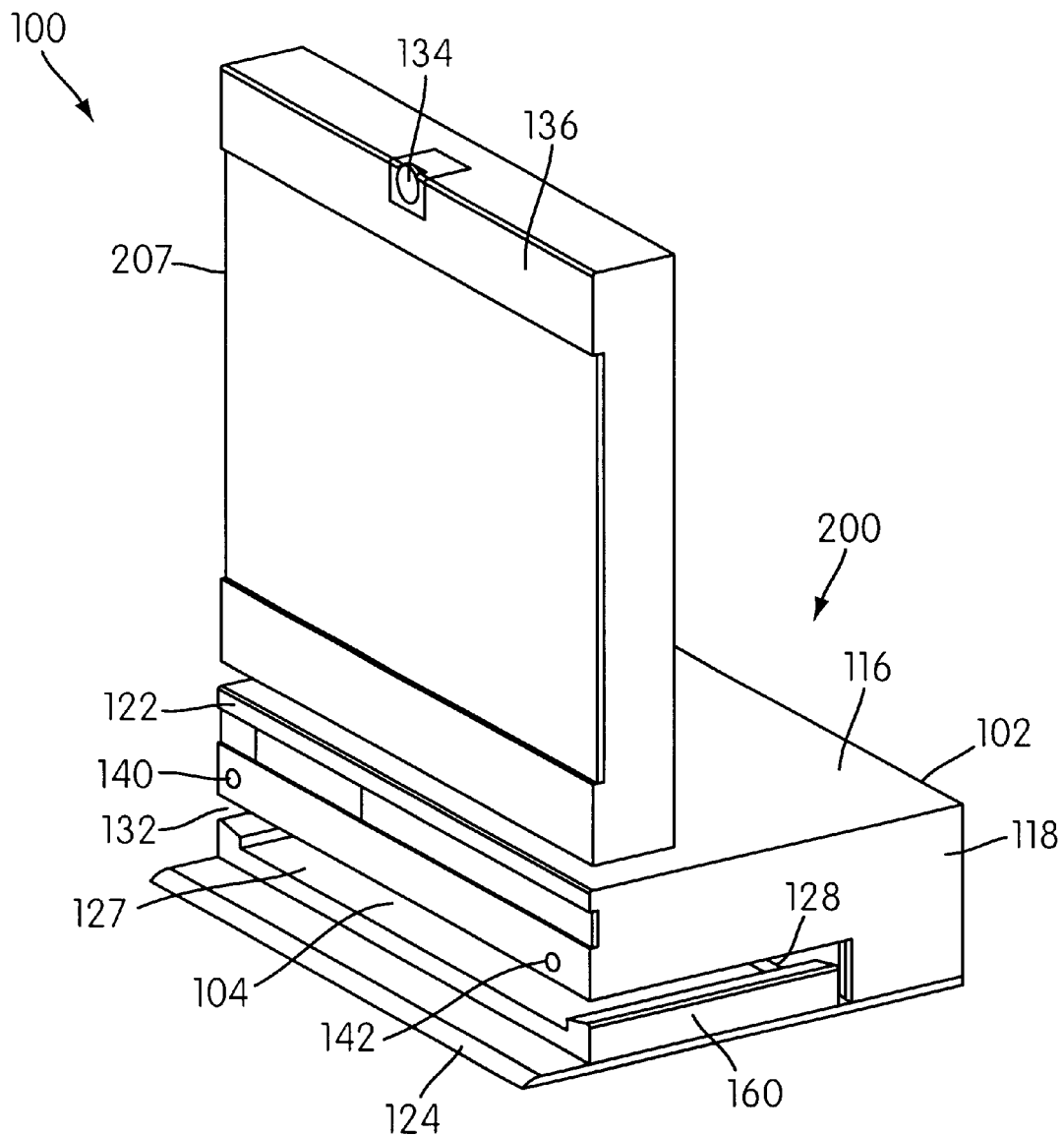
FIG. 2 is an isometric view of the front right side of a computer system.
Figure 3:
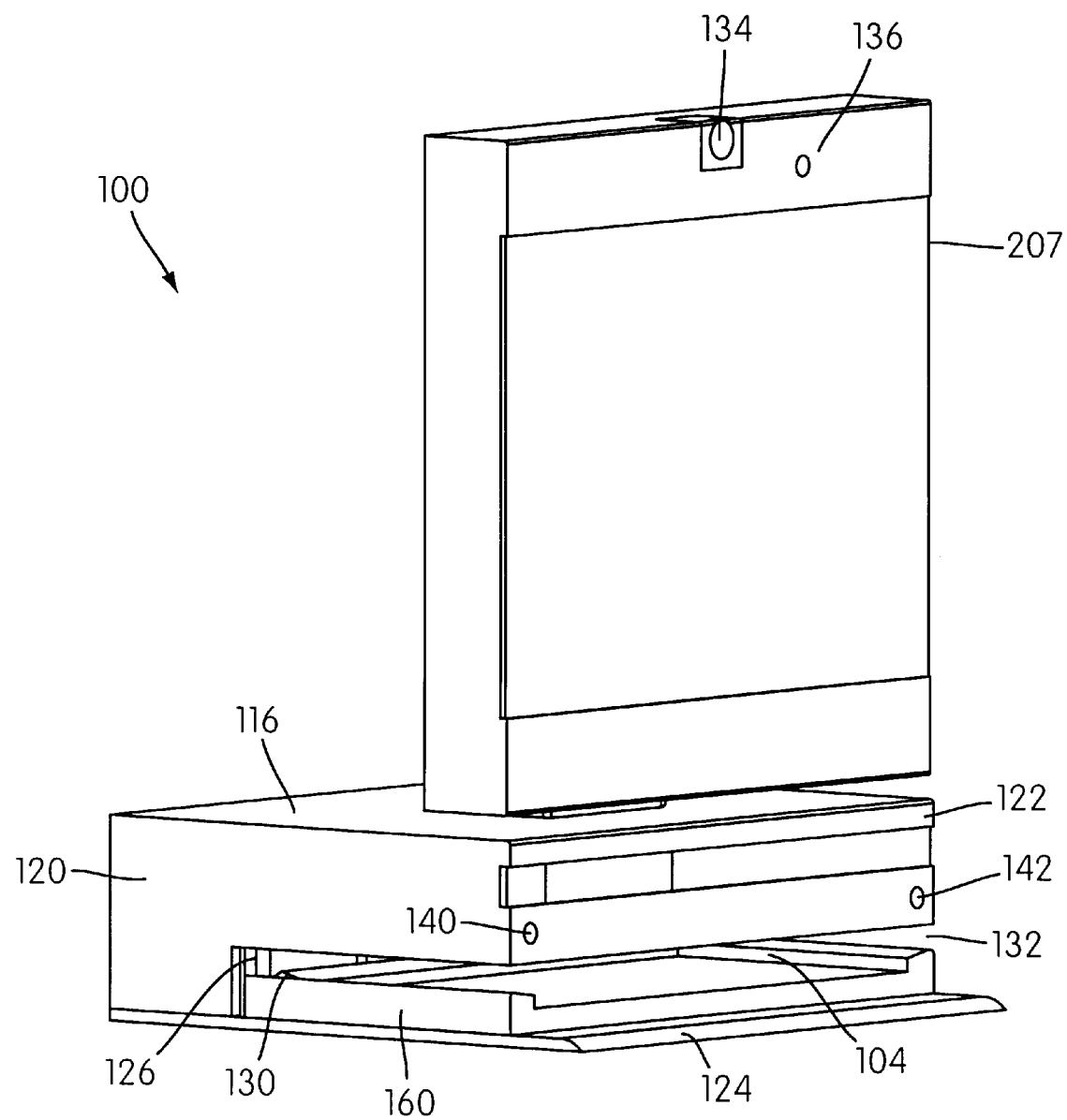
FIG. 3 is an isometric view of the front left side of the computer system.
Figure 4:
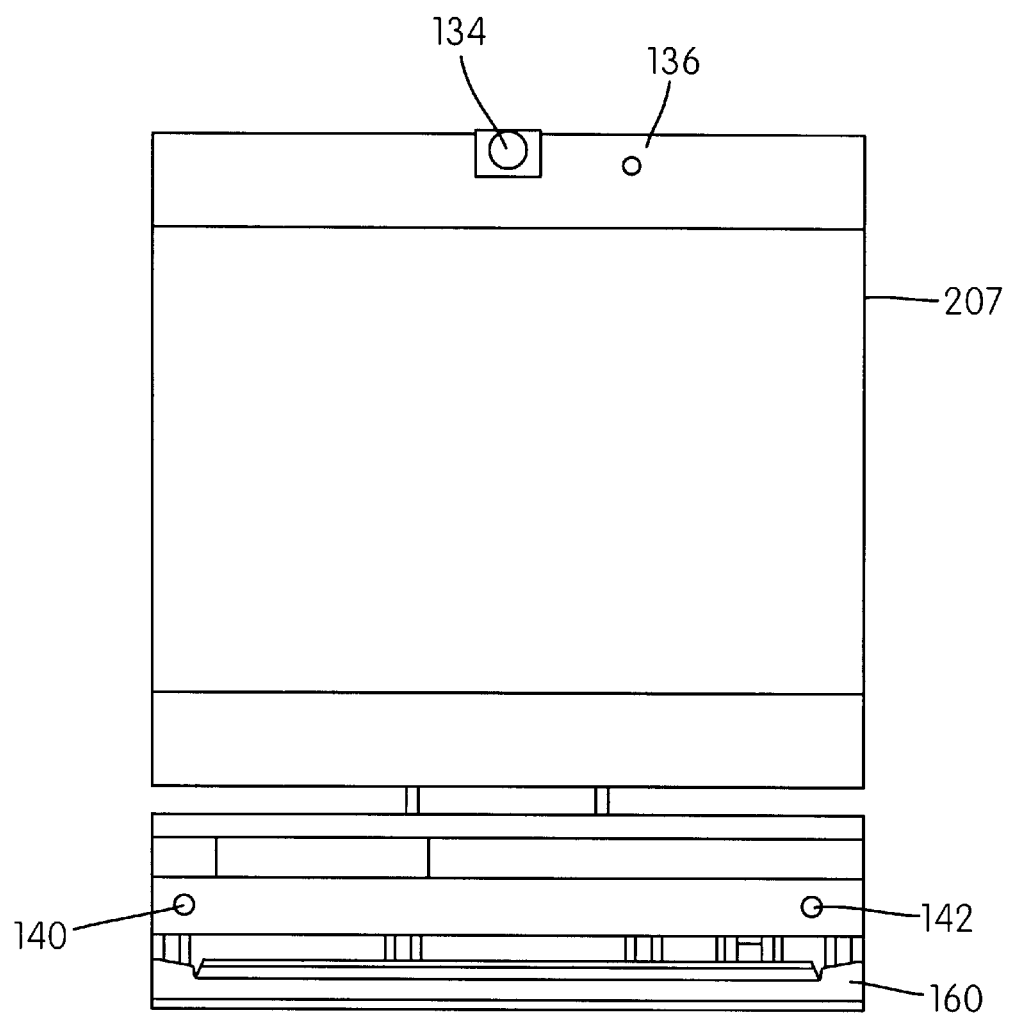
FIG. 4 is a front elevational view of the computer system.

Referring to FIGS. 2–5, the computer system 100 further includes a housing 102, and the keyboard storage portion 104. The housing 102 encloses and protects at least some of the internal components of the personal computer 200. The housing unit 102 preferably houses the processing unit 210. The housing 102 includes a top wall 116, right side wall 118, left side wall 120, and a front wall 122 in which the walls 116, 118, 120, 122 are interconnected. As shown in FIGS. 2, 3, and 5, the right and left side walls 118 and 120 may be stepped upwardly in the front so that a portion of the housing 102 is superimposed above the keyboard storage portion 104. The housing 102 also includes a recess 127 which defines the keyboard storage portion 104 and the recess 127 is sized for the carrier 160. The housing 102 also includes a rear internal wall 126 and a base 124 which forms the back and bottom boundaries of the recess 127 respectively. The base 124 forms the bottom of the housing 102.

The keyboard storage portion 104 is disposed within the housing 102 to substantially enclose and retain the keyboard 201. In the first position, the carrier 160 and the drive mechanism 180 are completely inside of the keyboard storage portion 104. In one embodiment, the keyboard storage portion 104 may be opened at its left and right sides as shown in the figures. However, in an alternative embodiment (not shown), the left and right sides of the keyboard storage portion 104 may be sealed or covered as desired. While illustrated as being open in FIGS. 2–5, the front face of the keyboard storage portion 104 may be enclosed or covered with a flap that is pivotally disposed on housing 102 above the keyboard storage portion 104 or on the base 124. The flap would be mounted and function similar to a coverflap on a video cassette recorder.

The computer system 100 further includes a support 110 for a monitor 207 that may be employed to fixedly attach the monitor 207 to the housing 102; a camera 134; a proximity sensor 136; and a power button 142. The camera 134 is preferably a digital type that is connected to the serial port interface 206 or the universal serial bus (not shown). The camera 134 may be built into the monitor 207 or provided as a separate component. The proximity sensor 136 senses the presence of a user who sits in front of the computer system 100. The proximity sensor 136 may be a built into the monitor 207 or provided as a separate component and may be a passive infrared type. The camera 134 may also be used with the software to function as a proximity sensor.

Figure 7:
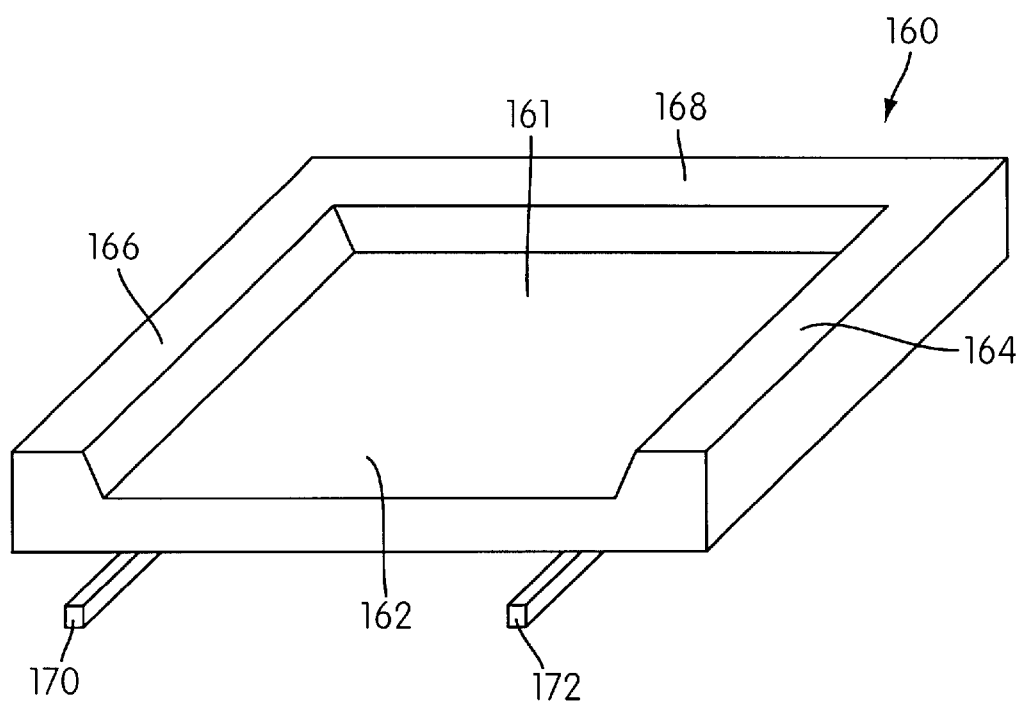
FIG. 7 is an isometric view of the carrier.
Figure 8:
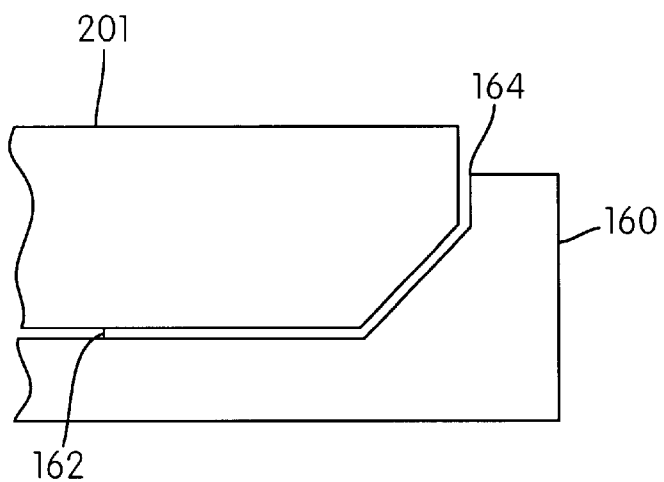
FIG. 8 is a partial view of a side of the keyboard and a lateral side of the carrier.

Referring to FIGS. 7 and 8, the carrier 160 is mounted for movement between the first position at least partially inside of the keyboard storage portion 104, and the second position at least partially external to the keyboard storage portion 104 in which the user may access the keyboard 201. In a preferred embodiment, the carrier 160 is slidably disposed on the base 124 within the keyboard storage portion 104. However, the carrier 160 may be slidably disposed on the side wall portions of the housing 102. The carrier 160 is sufficiently sized to receive the keyboard 201 thereon, and includes a receiving portion 162 for retaining the keyboard 201 therein. The receiving portion 162 preferably includes a substantially level surface 161, on which the keyboard 201 rests. The surface 161 may include a friction increasing material such as a rubberized material to minimize the lateral movement of the keyboard 201 while in transport or in use. The receiving portion 162 further includes a plurality of lateral side ledges that retain the keyboard 201 during use and transport to maintain the relative position in the receiving portion 162. The receiving portion 162 preferably includes a right ledge 164, a left ledge 166, and a rear ledge 168. The ledges 164, 166, 168 substantially define the receiving portion 162 of the carrier 160. Referring to FIG. 8, if desired, the right ledge 164, left ledge 166, and rear ledge 168 may provide complementary mating surfaces to the respective right, left and rear of the keyboard 201. This complementary structure assists in maintaining the relative position of the keyboard 201.

Figure 6:
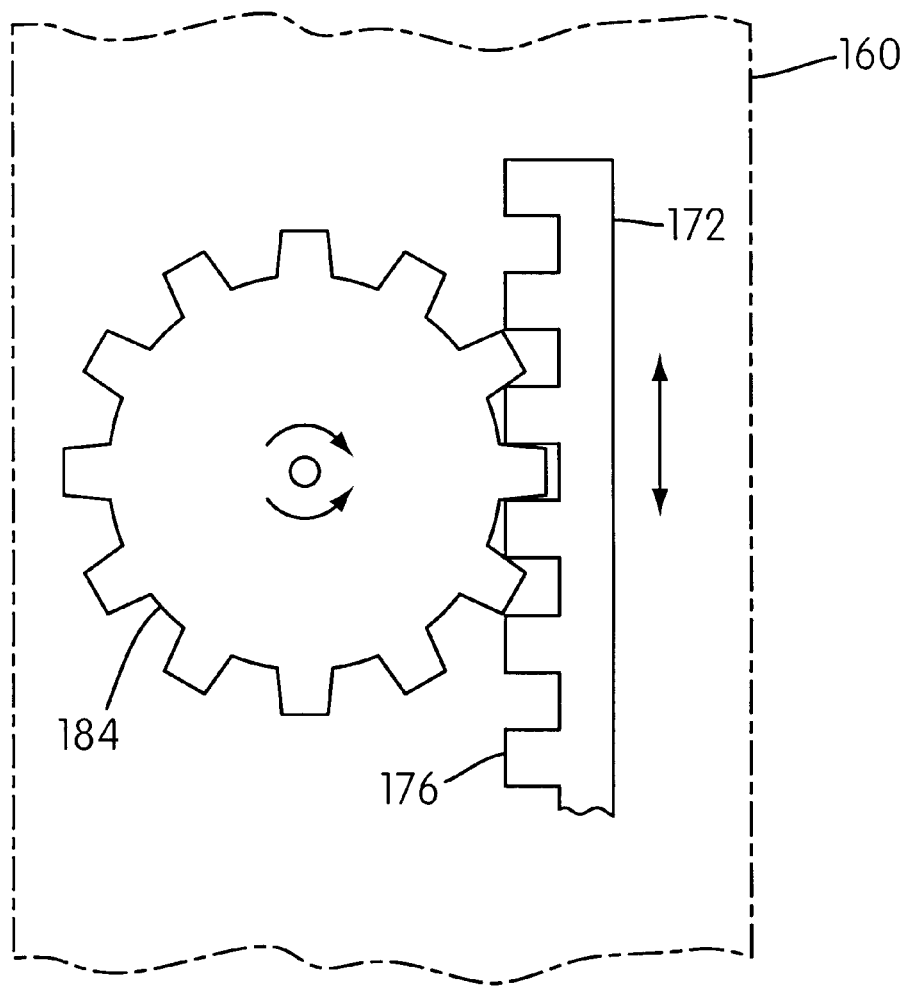
FIG. 6 is a schematic plan view of an embodiment of a drive mechanism and a carrier providing linear motion.

The carrier 160 and housing 102 may further include a structure to assist for movement of the carrier 160. This may include an adaptation of any dependable linear guides such as used on a sliding drawer structure. In a preferred embodiment, a left track 170 and a right track 172 allow the carrier 160 to move relative to the base 124 and the housing 102 including the processing unit 210. This movement is substantially linear in a reciprocal or back and forth manner. The left track 170 and a right track 172 are mounted on the bottom surface 174 underneath the carrier 160. In one arrangement, the tracks 170 and 172 may embody linear guides mounted on the right ledge 162 and left ledge 164. The tracks 170 and 172 may be movable in guides on the base 124. As shown in FIG. 6, in another arrangement, the left track 170 or the right track 172, or a separate structure, may include a plurality of gear teeth 176 that cooperates and engages with the drive mechanism 180. The cooperative features of the drive mechanism 180 and carrier 160 will be explained below. It will be appreciated that the carrier 160 may be any surface for retaining the keyboard 201 and need not include ledges. Also the tracks 170 and 172 may be any type of device, similarly found on many drawers, that allows substantially linear movement of the carrier 160, such as ball bearings, roller bearings, or rollers.

The drive mechanism 180 includes a number of different embodiments, for example, a gearing drive or a spring drive. The drive mechanism 180 provides power or motion to the carrier 160 in response to a control signal 400 from the computer system 100. In one arrangement, the drive mechanism 180 may be in the form of a solenoid unit (not shown) or a solenoid activates a movable member.

Figure 9:
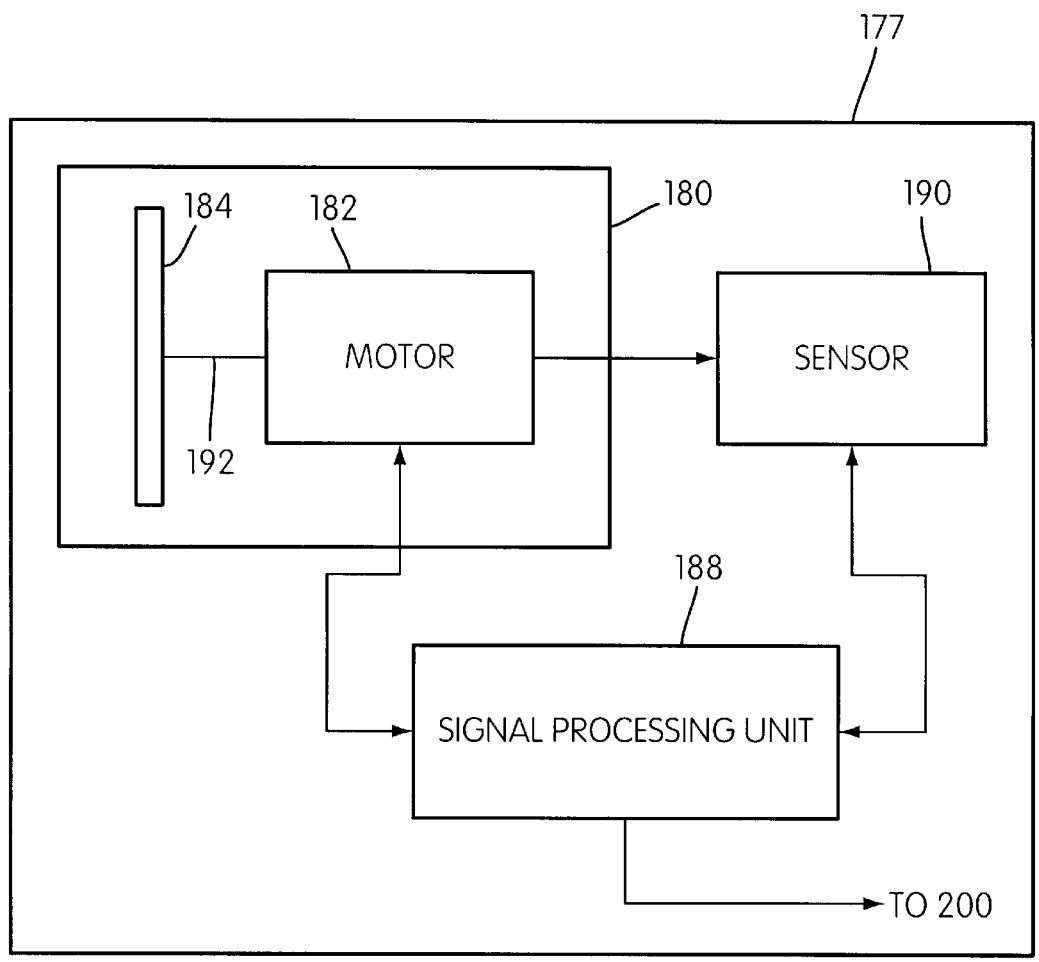
FIG. 9 is a schematic block diagram of one embodiment of a drive mechanism.

Referring to FIG. 9, in one embodiment, the drive mechanism 180 includes a motor 182, and a gear 184. The motor 182 includes a shaft 192 that rotates about an axis in which the shaft 192 imparts rotary motion to the gear 184. The gear 184 includes a plurality of teeth 186 that engages complementary gear teeth 176 of the carrier 160. In one arrangement the gear 184 has a circular periphery and the shaft 192 is mounted at the center of the gear 184. In yet another arrangement, the shaft 192 may include a worm gear 181 that engages the gear 184. In the worm gear 181 arrangement, the shaft 192 rotates about its axis, and the shaft 192 is disposed at a tangential position on the periphery of the gear 184. It can be appreciated that the gearing arrangement shown is exemplary in that the arrangement may include a plurality of gears of varying diameters to control speed or geometries for gear design. In addition, the gearing arrangement may include a complement of pulleys and gears to move the carrier 160.

Figure 10:
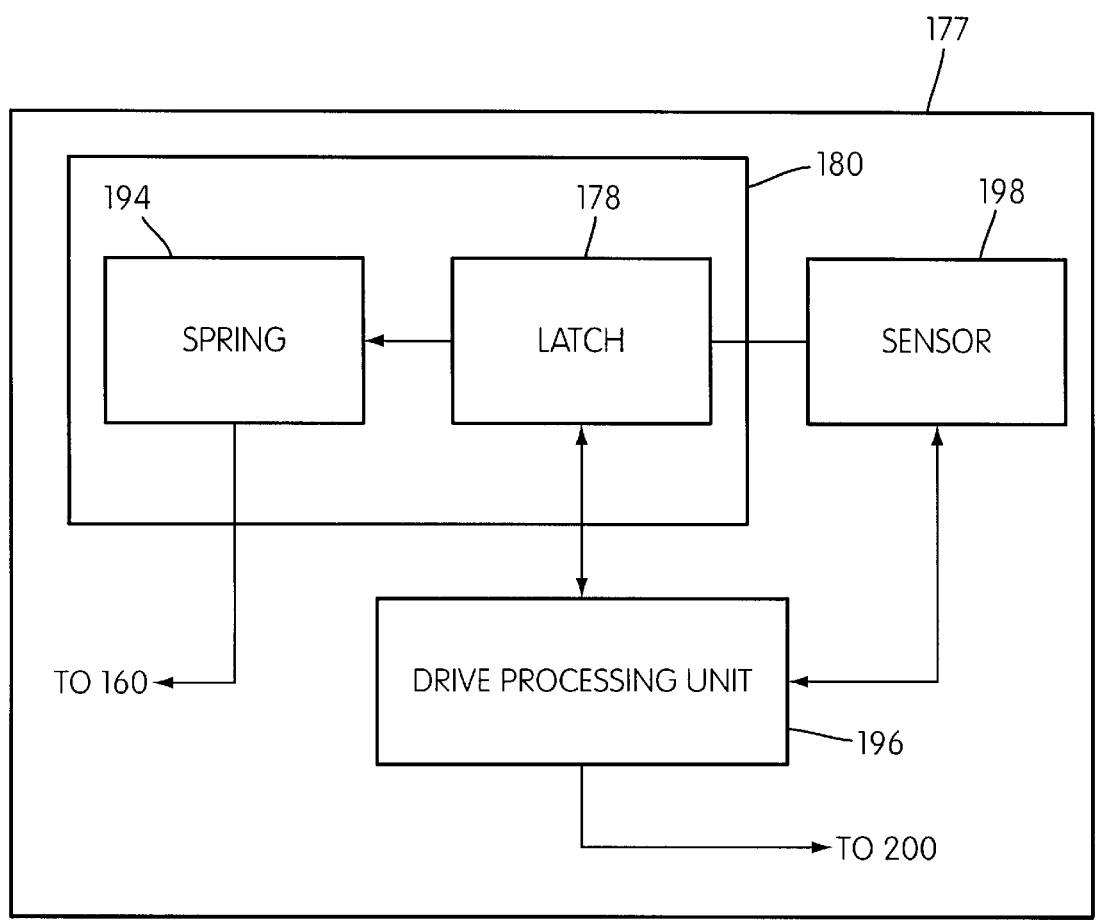
FIG. 10 is schematic block diagram of another embodiment of the drive mechanism.

FIG. 10 illustrates another embodiment of the drive mechanism 180 that includes a spring 194 biased towards pushing the carrier 160 away from the rear wall 126 of the keyboard storage area 104. The spring 194 is adapted to engage a rear surface of the carrier 160. In the spring 194 arrangement, the drive mechanism 180 includes a latch 178. The latch 178 may be electrical/mechanical device that retains the carrier 160 in the position enclosed within the keyboard storage portion 104. The latch 178 prevents the spring 194 from releasing energy to push the carrier 160 in a forward direction. The latch 178 also prevents the carrier 160 from traveling inadvertently forward out of the keyboard storage portion 104. Upon release of the latch 178 the carrier 160 is unlocked thereby allowing the spring 194 to create a pushing force sufficient to transport the carrier 160 to an extended position. The user merely pushes the carrier 160 back in place to reattach the carrier 160 to the latch 178.

In the event the computer system 100 is unpowered or there is an inadvertent malfunction, an emergency bypass is provided. The emergency bypass is disposed proximate to the keyboard storage portion 104 to activate the latch 178 without the aid of the drive processing unit 196. The emergency bypass may be in the form of a button or other device. One can appreciate, the spring 196 may be in many forms or shapes and may be a plurality of springs based on the designer choice.

In general, the drive control system 177 receives the control signal 400 and actuates the drive mechanism 180 thereby causing the carrier 160 to travel from an enclosed position within the keyboard storage portion 104 to an extended position. Likewise if desired, the control signal 400 will cause the drive mechanism 180 to reverse direction to retract the carrier 160 from the extended position to an enclosed position within the keyboard storage portion 104. The drive control system 177 is operatively coupled to the processing unit 210 via an appropriate interface, such as the serial port interface 206 or specially designed interface connected to the system bus 230. The control signal 400 may be electronic or mechanical if desired by the designer. In an electronic signal arrangement, the control signal 400 is generated from the computer system 100. In a mechanical signal arrangement, the control signal 400 is generated by a button, dial, or switch that generates a physical force.

The control signal 400 is generated from the computer system 100. The computer system 100 includes a software program for processing input data received from a control signal device 301. The control signal device 301 may be of various forms, the device 301 may include a depressible button 140, a software command, a proximity sensor 136, the camera 134, a virtual button on a touch sensitive screen (not shown), a depressible button on the input device 202, a scanner (not shown) that could recognize a discriminate an imprint of a thumb or a retina, an audible or audio sensor (not shown) for recognizing a verbal command from a user or similar input methods and devices. The software program may be implemented in the operating system 295, application programs 296, or other program modules 297 depending on the designer's preference.

Referring to FIG. 9, the drive control system 177 may include a signal processing unit 188, and a sensor 190. The signal processing unit 188 receives the control signal 400 and instructs or switches the motor 182 to rotate the shaft 192 clockwise or counter clockwise. When the motor 182 rotates the shaft 192 clockwise, the carrier 160 travels in a linear direction away from the rear wall 126 of the keyboard storage portion 104 and towards an extended position. Likewise, when the shaft 192 rotates counter-clockwise, the carrier 160 travels rearward towards the rear wall 126. The sensor 190 senses the position of the carrier 160. In a preferred arrangement, the sensor 190 may determine when the carrier 160 is substantially within the keyboard storage portion 104 and also determines when the carrier 160 is in an extended position. The signal processing unit 188 may include circuitry connected to a microprocessor, an application specific processor, relays, and/or switches. If desired, the signal processing unit 188 may include interfacing software to process the control signal 400 and inputs from the sensor 190 and motor 182.

The sensor 190 cooperates with the signal processing unit 188 and the motor 182. Alternatives for the sensor 190, includes a rotary encoder that generates pulses; or a timer device configured to advance the length of the carrier 160. In the timer device arrangement, the motor 182 operates for a predetermined time period associated with the length of the carrier 160. Optionally, the sensor 190 may determined the quantity or length of the carrier 160 exposed from the keyboard storage area 104. This is useful for situations where the full keyboard 201 is not required or when only a pointing device 202 is needed be exposed for use.

Referring to FIG. 10, the drive control system 177 may alternatively include a drive processing unit 196 connected to the computer system 100, and a position sensor 198. The position sensor 198 indicates to the computer system 100 via the drive processing unit 196 that the carrier 160 in the enclosed position or has been released forward. The position sensor 198 may be in the form of a switch or a microswitch disposed in the base 124; a switch combined with the latch 178 disposed at the rear end or front end of the keyboard storage portion 104; or any other appropriate location within the keyboard storage portion 104. In a preferred arrangement, the carrier 160 engages or depresses the switch or a microswitch to retain it in a normally closed position. When the carrier 160 moves forward, the switch is released and opens in which drive processing unit 196 senses the opened position. In this opened position, the drive processing unit 196 transmits a signal to the computer system 100 for processing. The drive processing unit 196 may include a relay, and a microprocessor with related circuitry. If desired, the drive processing unit 196 may include interfacing software to process the control signal 400 and input from the position sensor 198.

Figure 11:
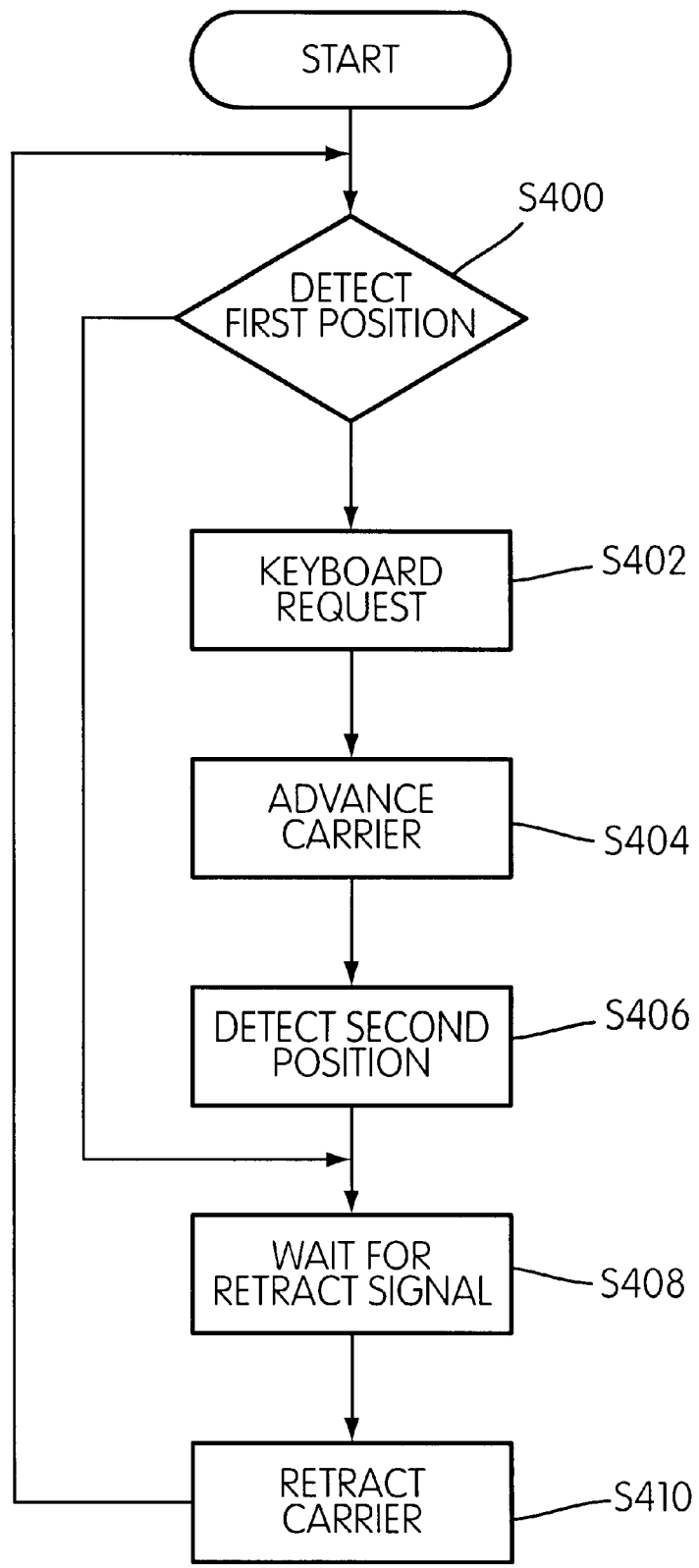
FIG. 11 is a flow diagram showing an operation sequence of the computer system of the present invention.

FIG. 11, illustrates a schematic of the control flow of the present invention including the operation of the drive control system 177. The control may begin with a detection of the carrier 160 in the first position at step S400. The control signal 400, such as a keyboard request command, is made from any implemented control signal device 301 at step S402. Control proceeds to step S404 where the carrier 160 is advanced forward, in a first direction (i.e. out of the keyboard storage portion 104) by the drive mechanism 180. In a gearing arrangement for the drive mechanism 180, a timer or encoder determines when the carrier 160 has reached the second position. At step S406 the extended position is detected. The control is then transferred to step S408 where the signal processing unit 188 waits to detect a retract signal. If a retract signal is detected control is transferred to step S410 where the carrier 160 reverses direction to travels towards the keyboard storage portion 104 back to the first position. If at step S400 is carrier 160 is not in the first position, control is transferred to step S408. It is fully appreciated that one skilled in the art could implement the present invention in various alternative steps. For example, there may steps to turn on indication lights of the carrier 160 position status.

Figure 12:
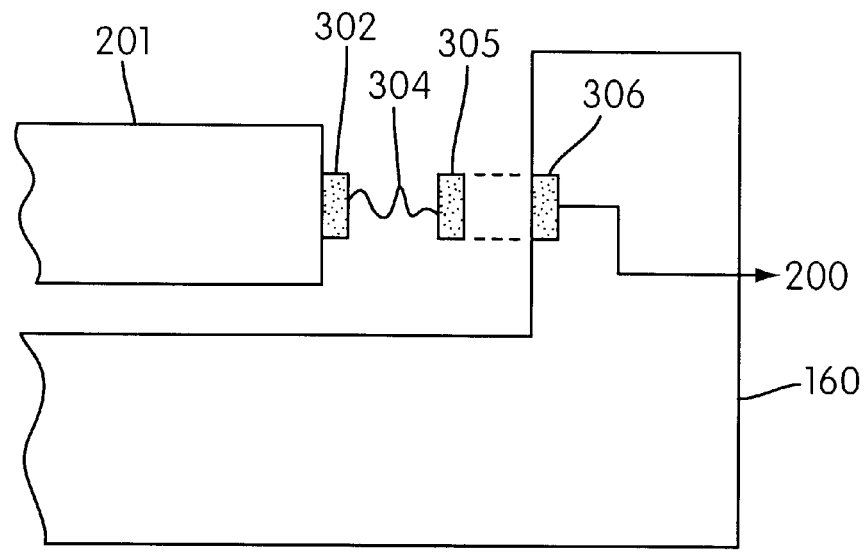
FIG. 12 is a schematic diagram of an embodiment of the keyboard and the carrier in a hard-wired signaling arrangement.

The keyboard 201 may provide signals directly to the serial port interface 206 of the computer 200 or may do so via a component on the carrier 160. FIG. 12, illustrates one signal relationship between the keyboard 2101 and the carrier 160. In the FIG. 12, the keyboard 201 transmits data to the personal computer 200 via a wired or cabled connection through the carrier 160. The keyboard 201 transmits data through its output 302. The keyboard output 302 is attached to a keyboard cable or cord 304 that includes a connector 305. The connector 305 is then removably mated with a complementary keyboard carrier connector 306 on the carrier 160. The carrier connector 306 is configured to be attached to send data to an interface of personal computer 200, such as the serial port interface 206 or a dedicated keyboard port (not shown). The keyboard cord 304, connector 305, and carrier connector 306 may be a conventional design and function. For instances, the connector 305 may be in the form of a DIN or a mini DIN connector; the keyboard carrier connector 306 may be a mating connector with the appropriate pin-out of DIN connectors. Also the carrier 160 may include a connection for a pointing input device, such as a mouse 202. The point device arrangement, may include conventional connectors and functional interfaces, such as an RS-232 interface, a PS/2 interface (not shown), or a mini-DIN connector (not shown).

Figure 13:
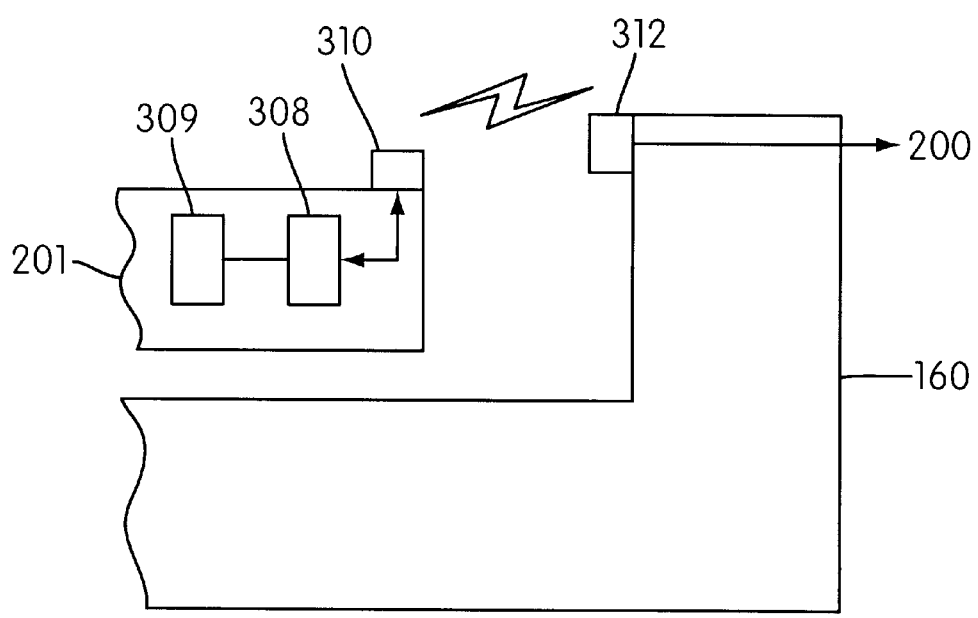
FIG. 13 is a schematic diagram of an embodiment of the keyboard and the carrier in a wireless signaling arrangement.

FIG. 13, illustrates an arrangement between the keyboard 201 and the carrier 160 where the keyboard 201 transmits data to the personal computer 200 via a wireless connection. The wireless connection arrangement provides the user additional freedom to use the keyboard 201. The keyboard 201 includes a mobile power source 309, such as a battery; an encoder/decoder processor 308; and a transmitter 310. The carrier 160 includes a receiver 312 operatively coupled to the processing unit 210 by way of a connection an interface of the personal computer 200, such as the serial interface port 206 or a dedicate port (not shown). The keyboard 201 will generate and transmit scan codes to the receiver 312. The wireless connection may include infrared frequencies or radio-controlled frequencies. The infrared wireless configuration may include the standard Infrared Data Association ("IrDA") protocols for point-to-point communications or other infrared wireless device technology. The radio-controlled configuration may include a transmitter 310 and receiver 312 operating at 49 MHz, but other alternative frequencies may be implemented. Also the carrier 160 may include a wireless receiver to receive signals from a pointing input device, such as a mouse 202 with a transmitter (not shown). If desired, the receiver 312 on the carrier 160 may receive wireless data from the mouse 202 and keyboard 201.

Figure 14:
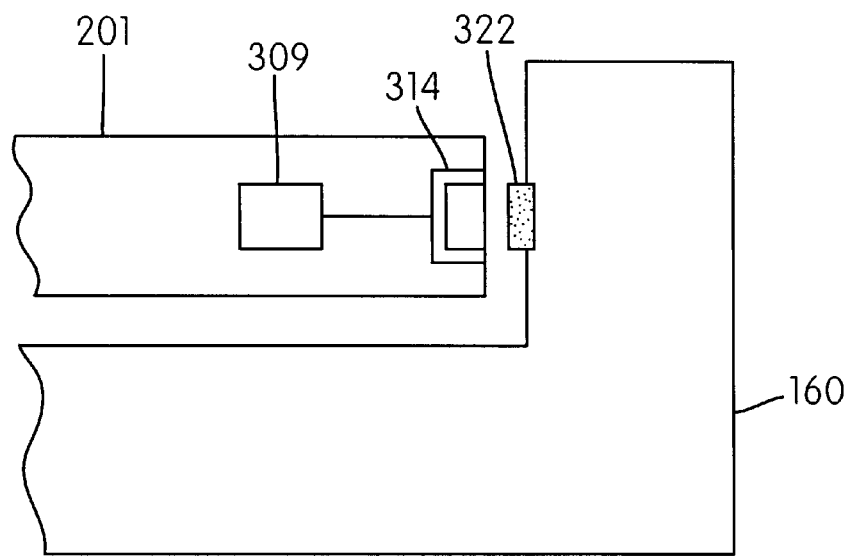
FIG. 14 is a schematic diagram of an embodiment of the keyboard and carrier in an induced current charging arrangement.

To make the keyboard 201 more mobile, it may also be battery powered, and the carrier 160 may be used to recharge the keyboard battery. FIG. 14, illustrates the carrier 160 including the keyboard 201 with an induced current charging arrangement. The keyboard 201 is configured for wireless operation and includes a mobile power source 309, such as a battery; a transmitter; and a charging coil 314 and associated circuitry (not shown). The mobile power source 309 may include a rechargeable battery. The carrier 160 includes a complementary shaped power source, such as a carrier coil 322. The carrier coil 322 is preferably attached to a power source and may be attached to a power receptacle on computer 200. The charging coil 314 and carrier coil 322 are configured such that when the keyboard 201 is disposed on the carrier 160 there is an electrical coupling between the charging coil 314 and carrier coil 322. The electrical coupling causes an induced current in the charging coil 314 for providing the induced current to the mobile power source 309 for charging. Because the keyboard 201 consumes low power, the mobile power source 309 will last extended periods of time. The keyboard 201 in the induced charging arrangement, is advantageous because the keyboard 201 will be retained in the carrier 160 for extended periods of time. This allows the keyboard 201 to be charged overnight or other times thus saving the user the cost of replacing conventional batteries. In this arrangement, the keyboard storage portion 104 proximate the rear wall 126 may include some minor shielding from stray magnetic flux potentially associated with the charging coil 314 and carrier coil 322.

Figure 15:
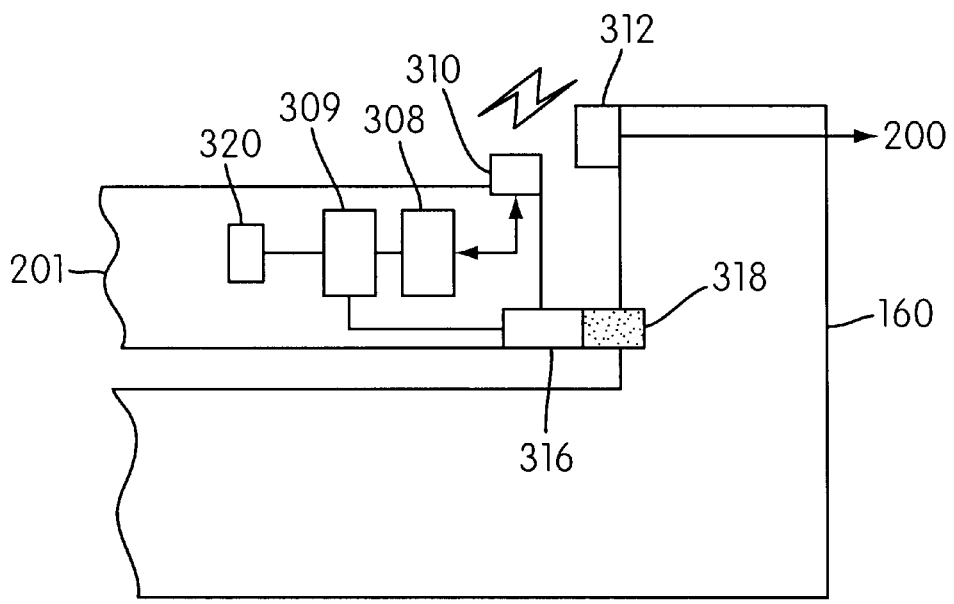
FIG. 15 is a schematic diagram of an embodiment of the keyboard and carrier in a contact battery charging arrangement.

The keyboard 201 may be battery power and have a direct current charging arrangement with the carrier 160. FIG. 15, illustrates the carrier 160 including the keyboard 201 in a direct charging contact arrangement. The keyboard 201 includes a mobile power source 309, such as a battery; and a transmitter 310. The mobile power source 309 may include a rechargeable battery. In this arrangement, the keyboard 201 includes a charging receiver 316 having a pinned connector adapted to engage and contact an interfitting connector of an electrical power source 318 on the carrier 160. The power pin connector 318 is coupled to any power source as described with respect to the carrier 160. The pinned connector is commonly implemented with charging mobile phone batteries or other well-known methods. The keyboard 201 also includes a charging controller 320 configured to monitor capacity of the mobile power source 309. In this arrangement, electrical current is transferred from the electrical power source 318 to the charging receiver 316 by way of the physical metal-to-metal contact of the pinned connection. It is recognized other electrical sources may be used such as a step-down AC-to-DC charger or other methods such as a physical plug may be used to provide power to charge the mobile power source 309. After the battery is charged, the keyboard is disconnected from the electrical power source 318. Because the keyboard 201 will be in the carrier 160 for an extended period of time and provides a continuous charging when in the carrier 160, the charging arrangement avoids the replacement of conventional batteries. Thus saving the user time and frustration of replacing conventional batteries and saving the cost of periodically replacing the conventional batteries.

Figure 16:
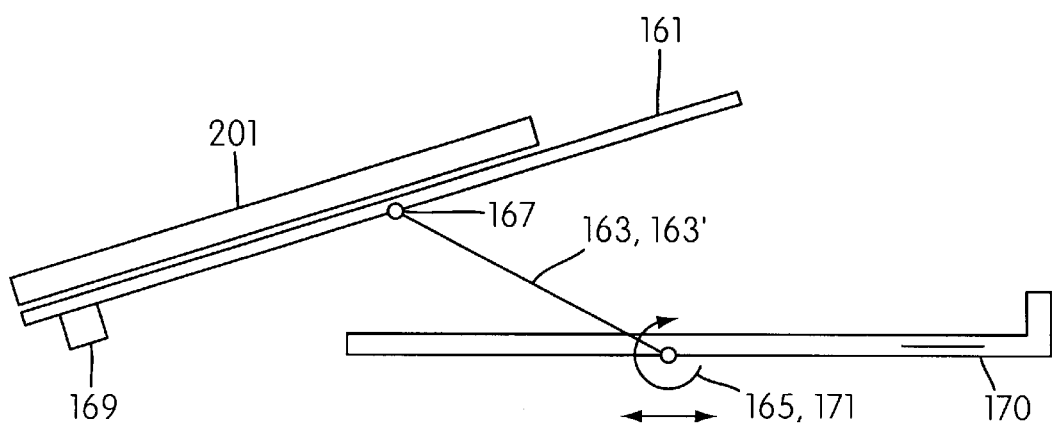
FIG. 16 is a side elevational view of an alternative embodiment of the carrier.

FIG. 16 illustrates an alternative embodiment of the carrier mechanism 160 that allows for incline adjustability of the keyboard 201. Carrier 160 in this embodiment includes a secondary carrier 161, pivotal arms 163, 163', a motorized pivot 165, 171, a secondary pivot 167, and a height adjuster 169. The secondary carrier 161 is connected to the carrier 160 at motorized pivots 165, 171. The motorized pivots 165, 171 are fixedly disposed in the linear direction of the carrier 160 and includes a motor (not shown) and associated gearing (not shown). In operation, the motor causes the pivotal arm 163, 163' to rotate clockwise in which the cooperation of the gearing of the motor and pivotal arm 163, 163' lifts the arm 163, 163' upward. In turn, the secondary carrier 161 rotates about the secondary pivot 167 and is simultaneously lifted upward. This action causes the secondary carrier 161 to be inclined relative to the carrier 160. Optionally, the motorized pivots 165, 171 may be manual in which the user moves the secondary carrier 161 into position. In this embodiment, the carrier 160 may include the drive mechanism 180, a wireless or wired arrangement for receiving output of the keyboard 201 as described earlier according to the present invention. The secondary carrier 161 is sized to retain or support the keyboard 201.

In lieu of the disclosure of computer system 100 being a personal computer 200 such as shown in FIG. 1, it is fully appreciated that one of ordinary skilled in the art could implement the present invention with other computer systems; for example a network computing system and separate terminals. In this alternative embodiment the moveable keyboard carrier 104 could be coupled to a terminal housing similar to that of computer housing 102. Further, computer system 100 could be what is commonly known as a Internet appliance or network appliance. The computer system 100 primarily accesses the Internet and operates software off the Internet. Such an arrangement would also preferably include a processing unit, a video display, a screen, a housing, and a keyboard.

There are other advantages to the present invention besides providing protection of the keyboard 201 or preserving worktop space. It is advantageous to present the keyboard 201 to the user, when it is required by an application program 296 or when the user desires to have it exposed for use. For example, the keyboard 201 is not required for all software applications; home and business users may use a personal computer for Internet browsing or occasional data entry. In one application of the present invention, the computer system 100 presents the keyboard 201 for heavy data processing, such as word processing and electronic spreadsheet applications.

A further advantage of the present invention is use for an additional security measure. An exposed keyboard is a security risk that may allow unauthorized individuals to access the computer. Individuals may use the keyboard to enter passwords or other commands to electronically break into a computer. Enclosing the keyboard or making it inaccessible to unauthorized users provides additional security protection.

While these particular embodiments of the invention have been shown and described, it is recognized that various modifications thereof will occur to those skilled in the art. Therefore, the scope of the herein-described invention shall be limited solely by the claims appended hereto.

What is claimed is:

1. A computer system, comprising:

a processing unit;

a processing unit housing containing said processing unit;

a keyboard including a keyboard housing, said keyboard configured for generating input signals to said processing unit in at least a partially exposed position relative to said processing unit housing;

a carrier sized for retaining a the keyboard thereon, said keyboard housing being removable from said carrier, said carrier movable relative to said processing unit; and a drive mechanism capable of moving said carrier and said keyboard between a position within said processing unit housing to the at least partially exposed position.

2. The computer system of claim 1, wherein said drive mechanism includes a spring.

3. The computer system of claim 1, further comprising a sensor connected to said drive mechanism for determining a position of said carrier relative to said processing unit.

4. The computer system of claim 1, wherein the carrier is slidably mounted to said housing.

5. The computer system of claim 1, wherein said drive mechanism includes a motor.

6. The computer system of claim 5, wherein said drive mechanism includes a gear.

7. A computer system, comprising:

a processing unit;

a carrier sized for retaining a keyboard thereon, said carrier movable relative to said processing unit; and a drive mechanism capable of moving said carrier;

wherein said drive mechanism includes a motor and a gear; wherein said carrier includes at least a portion of a battery charger.

8. The computer system of claim 7, further comprising a keyboard.

9. The computer system of claim 8, wherein said keyboard includes a first connector and said carrier further includes a second connector, said first and second connectors interfitting with respect to each other.

10. The computer system of claim 8, wherein said keyboard includes a transmitter for wireless operation.

11. The computer system of claim 10, wherein said carrier includes a receiver for receiving signals transmitted by said keyboard.

12. A computer system, comprising:

a keyboard having a keyboard housing;

a processing unit housing, wherein the processing unit housing includes a keyboard storage portion at least partially located therein;

a processing unit disposed within said processing unit housing;

a movable carrier sized for supporting the keyboard housing thereon, the carrier having a first position at least partially disposed within the keyboard storage portion and a second position at least partially disposed outside of the keyboard storage portion; wherein said keyboard is configured to be removable from said movable carrier, and said keyboard is exposed for use in said second position enabling the keyboard to send signals to the processing unit; and a drive mechanism configured for moving said carrier between said first position and said second position.

13. The computer system of claim 12, wherein said carrier is a first carrier, said computer system further includes a second carrier movably disposed on said first carrier, said second carrier is sized to support the keyboard and movable relative to said first carrier.

14. The computer system of claim 12, further comprising:

an input device for signaling said drive mechanism to move said carrier, wherein said input device is operatively coupled to said processing unit.

15. The computer system of claim 14, wherein the drive mechanism includes a motor.

16. The computer system of claim 15, wherein the drive mechanism includes a position sensor for sensing the position of the carrier.

17. The computer system of claim 14, wherein the input device is a proximity sensor for sensing the presence of an user relative to said processing unit housing.

18. The computer system of claim 14, wherein the input device is a physically depressible button.

19. The computer system of claim 12, wherein the keyboard storage portion is partially bound by a pivotally mounted flap.

20. The computer system of claim 12, wherein said movable carrier is slidably mounted relative to said housing.

21. A computer system, comprising:

a processing unit housing, wherein the housing includes a keyboard storage portion at least partially located therein;

a movable carrier sized for supporting a keyboard thereon, the carrier having a first position at least partially disposed within the keyboard storage portion and a second position at least partially disposed outside of the keyboard storage portion;

a processing unit within said processing unit housing;

a drive mechanism for moving said carrier between said first position and said second position; and an input device for signaling said drive mechanism to move said carrier, wherein said input device is operatively coupled to said processing unit, wherein the input device is an audio sensor responsive to an audio command.

22. A computer system, comprising, a keyboard having a battery connected to a charging connector, said keyboard having a keyboard housing ; and a carrier sized for retaining the keyboard thereon, said carrier having at least a portion of a battery charger; wherein said carrier includes a receiving surface for said keyboard housing, said keyboard housing having a lower surface which rests on said receiving surface of said carrier, said charging connector is removably coupleable to said portion of said battery charger to enable the charging of said battery of said keyboard when said charging connector is coupled to said portion of the battery charger.

23. The computer system of claim 22, further comprising a processing unit, said keyboard providing an input signal to said processing unit.

24. The computer system of claim 22, wherein said keyboard includes a wireless transmitter for sending data and said carrier includes a receiver for receiving said data for said processing unit.

25. The computer system of claim 22, further comprising a drive mechanism for imparting movement to said carrier.

26. The computer system of claim 25, wherein said drive mechanism includes a motor.

27. The computer system of claim 22, further comprising a processing unit housing having an opening sized for receiving said carrier.

28. The computer system of claim 27, wherein the drive mechanism moves said carrier between a first position at least partially within the opening of the housing and a second position at least partially outside of the opening for allowing a user to access said keyboard.

29. The computer system of claim 22, wherein said portion of said battery charger interfaces with said charging connector to transmit a direct current to said battery.

30. A computer system, comprising:

a processing unit having a housing;

a keyboard having a wireless transmitter for transmitting a signal; and a movable carrier sized to retain said keyboard thereon, said movable carrier having a receiver for receiving said signal, said receiver of said movable carrier being operatively coupled to said processing unit; wherein said keyboard is removable from said movable carrier and said housing includes an opening sufficiently sized to retain said keyboard and said movable carrier therein.

31. A computer system, comprising:

a processing unit;

a keyboard configured for generating input signals to said processing unit, said keyboard having a keyboard housing;

a movable carrier sized for retaining the keyboard thereon, said keyboard housing being removable from said movable carrier; and a drive control system operatively coupled to said processing unit, wherein said drive control system initiates movement of the carrier relative to the processing unit in response to a control signal from said processing unit.

32. The computer system of claim 31, further comprising a housing, wherein said processing unit, said movable carrier, and said drive control system are disposed within the housing.

33. The computer system of claim 31, wherein the control signal is initiated by a computer implemented software command.

34. The computer system of claim 31, wherein the control signal is initiated by an actuation of a button.

35. The computer system of claim 31, wherein the control signal is initiated by a detection of a sensor which detects the presence of a user in proximity to said processing unit.

36. A method of moving a keyboard carrier in a computer system, the carrier sized to retain a keyboard thereon, said keyboard being separable from said carrier, the computer system further including a drive mechanism coupled to the carrier and a processing unit, the method comprising the steps of:

providing a control signal to the drive mechanism;

moving the carrier and said keyboard by the d rive mechanism to an extended position away from said processing unit; and sending signals to the processing unit by the keyboard in the extended position.

37. The method of claim 36, wherein the step of providing the control signal includes receiving a verbal command.

38. The method of claim 36, wherein the step of providing the control signal includes sensing the presence of a user in proximity to said processing unit.

39. The method of claim 36, wherein the step of providing the control signal includes scanning at least one of a portion of a retina and a portion of a fingerprint.

40. A method of charging a battery-powered keyboard in a computer system including a movable carrier having a portion of a battery charger, said movable carrier sized for retaining said keyboard thereon and said keyboard having a keyboard housing separable from said movable carrier, the method comprising the steps of:

physically coupling the keyboard to said portion of the battery charger; in said moveable carrier; and separating the keyboard from the portion of the battery charger.

41. The method of claim 40, wherein said step of physically coupling includes abutting a charging connector of said keyboard to said portion of said battery charger.

42. The method of claim 41, wherein said step of physically coupling includes retaining said keyboard on said movable carrier.

43. The method of claim 41, wherein said a step of physically coupling includes transferring an electrical current to said keyboard.

44. A method of wireless communication in a computer system between a keyboard and a processing unit, the keyboard having a transmitter, and the computer system further including a movable carrier for retaining the keyboard thereon and the processing unit having a housing with an opening sized to retain the keyboard and the movable carrier therein, the method comprising the steps of:

moving the keyboard and the movable carrier into an extended position from a position at least partially within said opening of said housing;

transmitting a wireless signal from said transmitter of the keyboard while said keyboard and said movable carrier are in said extended position;

receiving the wireless signal by the receiver on the movable carrier; and processing the wireless signal by the processing unit.

45. The method of claim 42, wherein said step of moving includes moving said keyboard and said carrier linearly to said extended position.

* * * * *